Feb. 6, 1923.
E. C. SCHROEDER.
CORN HUSKING MACHINE.
FILED SEPT. 20, 1920.
1,444,009
3 SHEETS-SHEET 1
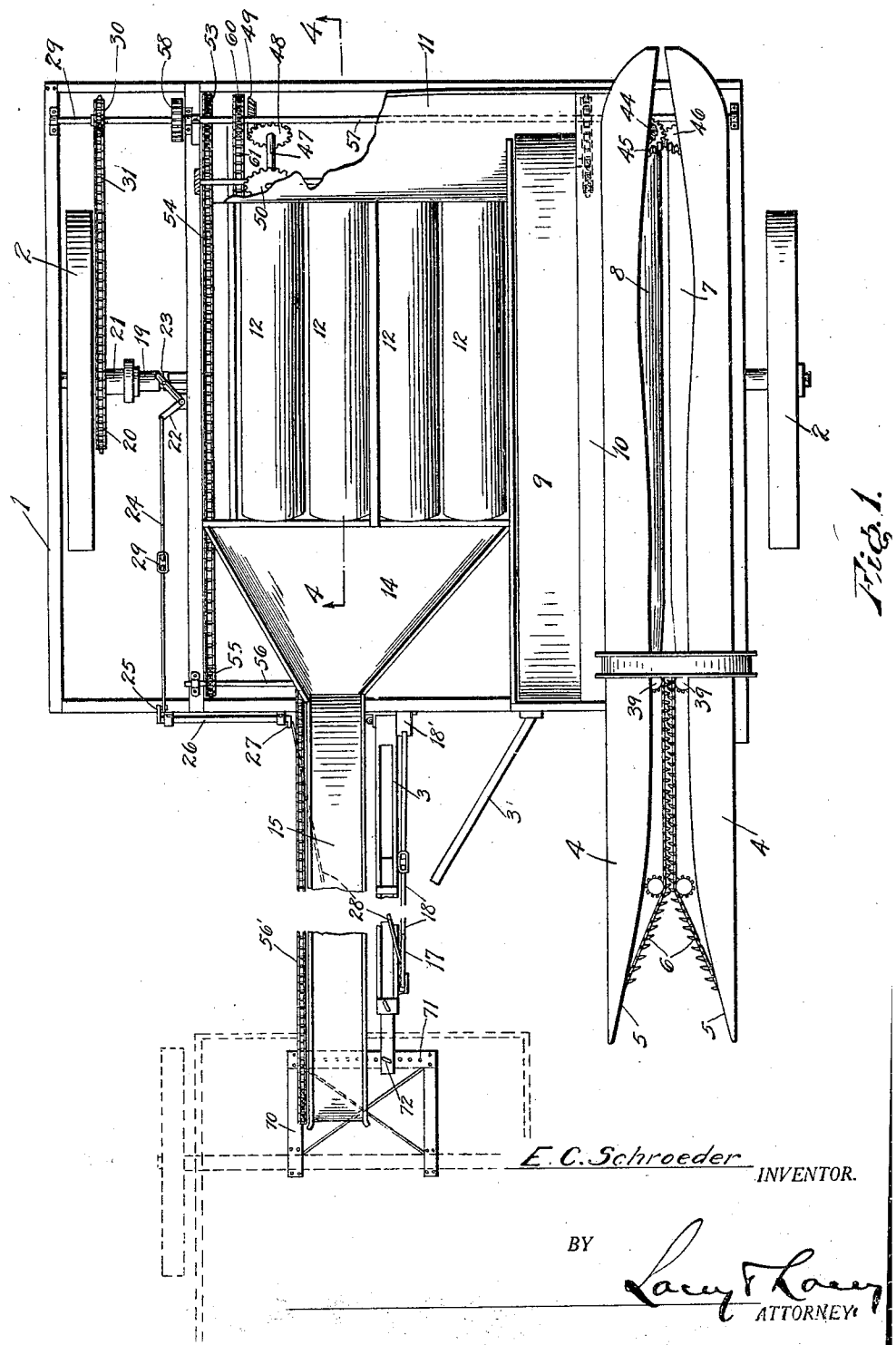
E.C.Schroeder INVENTOR.
BY
ATTORNEY

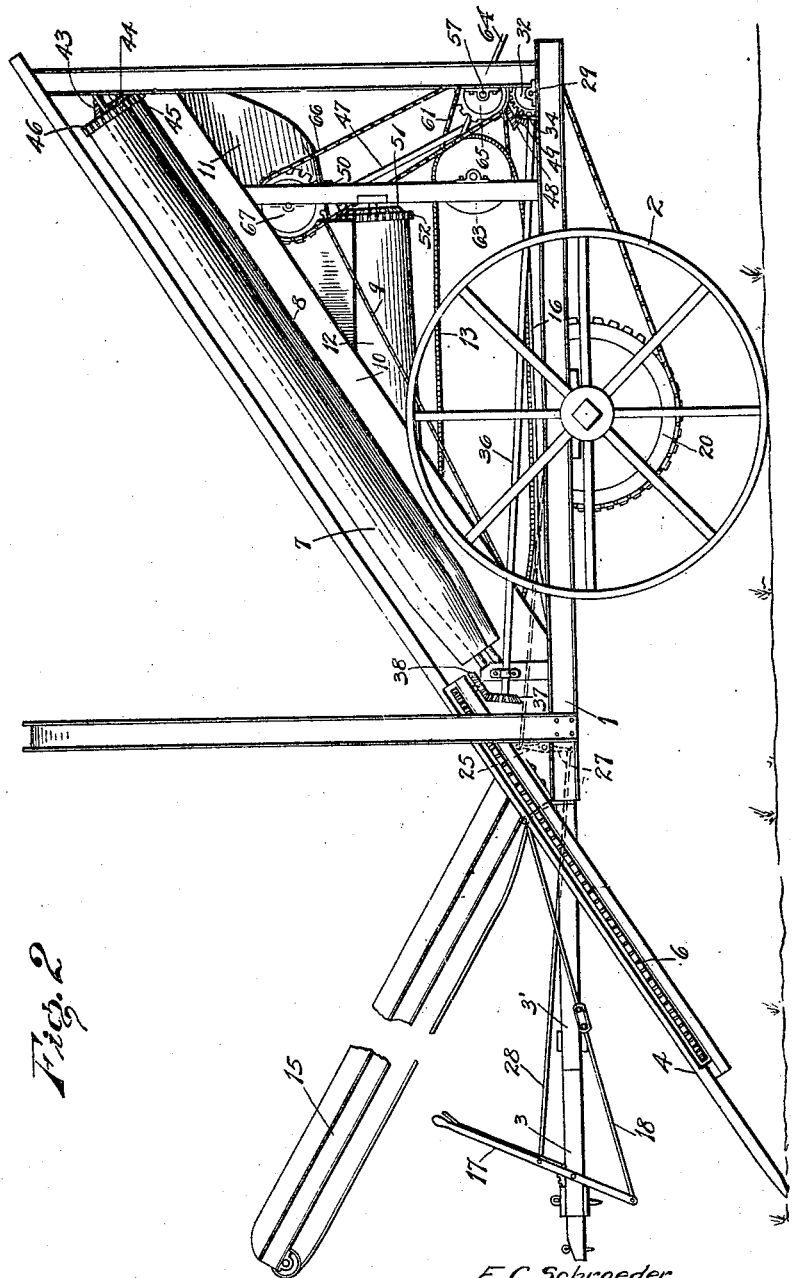

Feb. 6, 1923.
E. C. SCHROEDER.
CORN HUSKING MACHINE.
FILED SEPT. 20, 1920.
1,444,009
3 SHEETS-SHEET 3
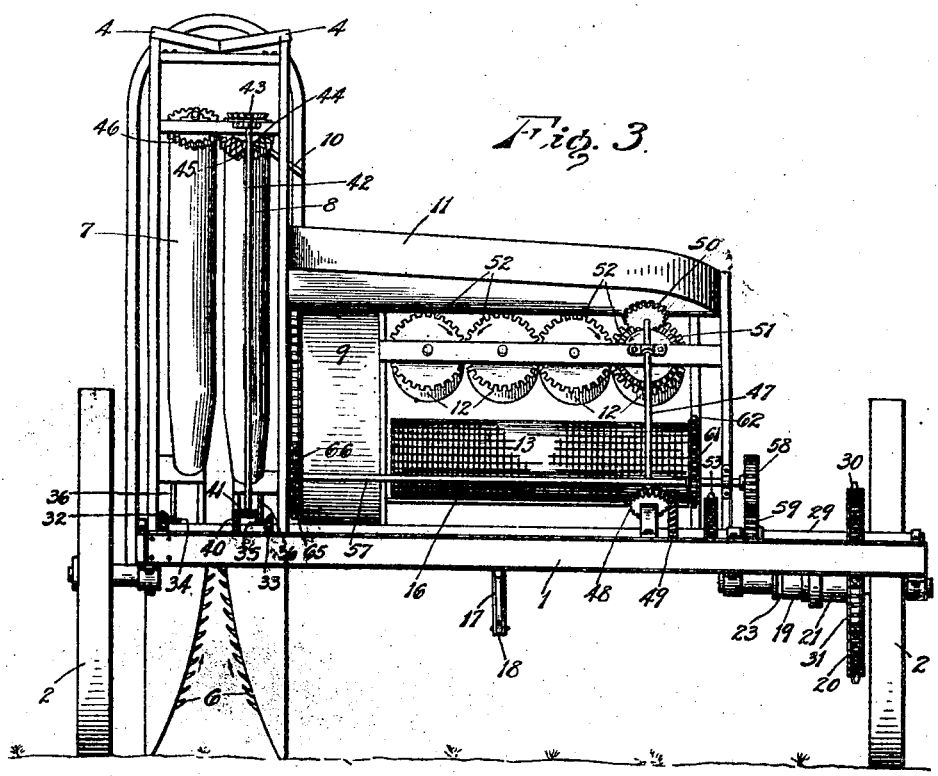
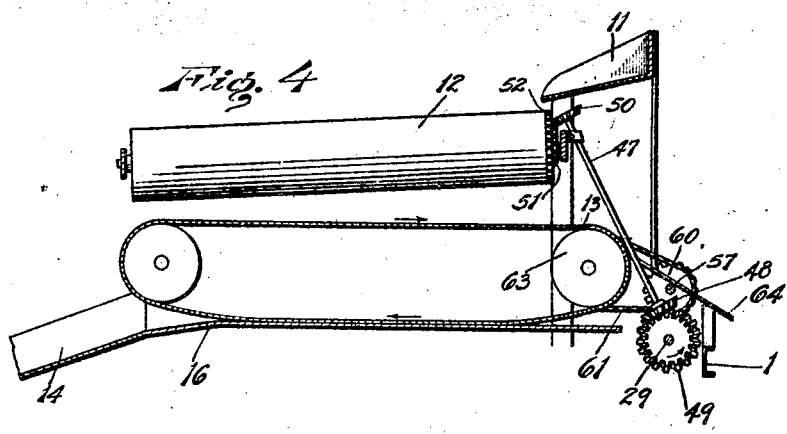
E. C. Schroeder
INVENTOR.
BY
ATTORNEYS Patented Feb. 6, 1923.

1,444,009

UNITED STATES PATENT OFFICE.

EDWARD C. SCHROEDER, OF POSTVILLE, IOWA.

CORN-HUSKING MACHINE.

Application filed September 20, 1920. Serial No. 411,352.

*To all whom it may concern:*

Be it known that I, EDWARD C. SCHROEDER, citizen of the United States, residing at Postville, in the county of Allamakee and State of Iowa, have invented certain new and useful Improvements in Corn-Husking Machines, of which the following is a specification.

This invention relates to corn husking machines and has for its object the provision of an efficient machine which may be drawn over a field and, in its progress, will strip ears of corn from the standing stalks, remove the husks and deposit the same upon the ground in rear of the machine, and deliver the ears free of the husk into a wagon. The invention resides in certain novel features of construction, arrangement and combination of the parts all of which will be hereinafter fully set forth.

In the accompanying drawings—

Figure 1 is a plan view of one embodiment of my invention;

Fig. 2 is a side elevation of the same;

Fig. 3 is a rear elevation thereof;

Fig. 4 is a detail section on the line 4—4 of Fig. 1.

In carrying out my invention, I employ a frame 1 which may be of any substantial construction and is supported upon wheels 2 which also drive the working parts through suitable gearing. At the front side of the frame 1, I secure a tongue 3 which is to be coupled at its front end to an ordinary farm wagon so that the harvesting and husking machine may travel directly in rear of the wagon and deliver the clean ears of corn thereto. A brace 3' is provided to impart rigidity to the structure. Upon the frame 1, at the side thereof, I secure the inclined guards 4 which are firmly supported upon the frame and have their front ends resting upon the ground, as shown clearly in Fig. 2, the said front ends being flared, as shown at 5 in Fig. 1. The inner edges of these guards and guides 4 are out of contact so as to present a slot or runway which permits the guards to pass along the row of stalks at opposite sides of the same so that, as the machine progresses, the stalks will be raised and straightened and the inner edges of the guards will be caused to ride against the ears of corn which will be stripped from the stalk. To expedite the straightening of the stalks and the travel of the machine past the same, I mount below the guards 4 a pair of cooperating feeder belts 6 which are provided with rearwardly projecting fingers on their opposed runs which are adapted to take into the lower portions of the stalks and by their engagement therewith prevent the stalks falling forward as the machine travels past the same. Immediately in rear of the feeder belts 6 and below the guards, I mount the longitudinally disposed snapping rollers 7 and 8 which are disposed close together in parallel spaced relation so that they will engage the stalks as the latter pass through the guideway furnished by the guards. The inner roller 8 is slightly below the outer roller 7 so that as the ears are snapped from the stalks they will fall inwardly and roll onto an elevator or conveyer 9 which is mounted upon the main frame adjacent the snapping rollers, a bridge plate 10 being provided over the space between the snapping rollers and the elevator to prevent the ears of corn dropping therethrough. The elevator extends upwardly and rearwardly to deliver the ears of corn onto a chute or shelf 11 which is disposed transversely of the frame at the rear thereof and inclined in the same direction as the husking rolls and down which the corn may travel by gravity to be delivered onto the husking rollers 12 which are arranged in pairs and are disposed longitudinally of the frame and have their front ends somewhat lower than their rear ends so that the corn will gravitate to the front of the machine. The husking rollers are so driven by gearing operatively connected with the axle of one of the ground wheels 2 that the members of each pair will rotate toward each other with their upper surfaces moving into the bight between the rollers. The husks will consequently be caught and stripped from the ears of corn and pass between the rollers onto a belt or conveyer 13 arranged below the rollers and traveling rearwardly whereby the husks will be deposited upon the ground in rear of the machine. The cobs with the kernels thereon will pass over the front ends of the husking rollers onto a chute 14 which extends downwardly and forwardly from the rollers to an elevator 15 which is supported upon the front end of the frame 1 and extends over the wagon so that the corn taken up by the elevator will be deposited in the wagon. The apron or conveyer 13 is preferably of coarse mesh fabric or netting so that any kernels which may be shelled from the cobs will drop onto a plate 16 carried by the frame below the said apron and will be scraped forwardly on the plate by the lower return flight of the apron and discharged over the front end of said plate into the chute 14 as will be readily understood. I thus avoid loss of the kernels and provide for the feeding of the same to the elevator 15 so that they will be delivered into the wagon with the full or nearly full ears.

When the machine is in operation, the frame 1 is parallel with the surface of the ground or approximately level, as shown in Fig. 2. When the machine is not in operation, however, as when being drawn into a barn or from field to field, it is tilted somewhat so that the front ends of the guards 4 will be raised and cannot dig into the ground. For this purpose, a hand lever 17 is mounted upon the tongue 3 and its lower end is connected by a link 18, with a rigid arm 18' rising from the front end of the frame, the tongue being hinged or pivoted to the frame, as will be understood. When the lever is swung forward, the frame will rock about the axles of the carrying wheels 2 and lift the front ends of the guards 4. The link 18 is preferably extensible so that the movement of the front end of the frame may be regulated as desired.

One of the carrying wheels, preferably the one remote from the snapping rollers, is utilized as the means for driving the operating mechanism. Said wheel is fixed to its axle and upon the inner portion of the axle is slidably mounted a clutch sleeve 19 which is constrained to rotate with the axle while loosely fitted upon the axle between the clutch sleeve and the ground wheel, is a sprocket gear 20 having a clutch hub 21, said hub being held against endwise movement in any convenient or preferred manner. Obviously, if the members 19 and 21 are disengaged, the sprocket 20 will remain at rest and none of the working parts will operate, and I provide means whereby the clutch will be released when the main frame is tilted. Upon the frame, adjacent the clutch, I fulcrum an angle lever 22 having one arm carrying a pin playing in an annular groove 23 in the clutch sleeve 19 and its other arm projecting forwardly and pivoted to the rear end of a connecting rod 24. The front end of the connecting rod is pivoted to a crank 25 on the outer end of a transverse rock shaft 26 which is journaled upon the front end of the main frame and is provided with a crank 27 at its inner end disposed reversely to the crank 25 and connected by a link 28 with the lever 17 at a point above the fulcrum of the latter. A turnbuckle 29 in the connecting rod 24 regulates the throw of the same. When the lever is swung forward, the shaft 26 is rocked so as to move the connecting rod 24 rearwardly and turn the lever 22 so that it slides the clutch sleeve 19 inwardly thereby throwing the machine out of gear as the frame is tilted.

The main shaft 29 extends across the rear end of the machine and is journaled in suitable bearings upon the main frame, the shaft receiving motion through a sprocket pinion 30 thereon and a chain 31 trained around the same and the gear 20. Upon the shaft 29, in the vertical planes of the guards 4, are the opposed beveled gears 32 and 33 meshing respectively with the similar pinions 34, 35 on the rear ends of the shafts 36 which are provided at their front ends each with a pinion 37. Each pinion 37 meshes with a pinion 38 on the lower end of a short shaft which is mounted in the frame of one feeding chain 6 and carries a sprocket 39 on its upper end to engage and drive said chain. Between the pinions 32 and 33, a bevel pinion 40 is fixed on the shaft 29 and this pinion meshes with a similar pinion 41 on the lower end of a vertical shaft 42 upon the upper end of which is a pinion 43. The pinion 43 meshes with a beveled gear 44 on the upper rear end of the snapping roller 8 which is also provided with a spur gear 45 meshing with a similar gear 46 on the rear end of the snapping roller 7 whereby the snapping rollers will be rotated in opposite directions to properly perform their function. The husking rollers are also driven from the shaft 29 for which purpose a shaft 47 is mounted on the frame and equipped at its lower end with a beveled gear 48 meshing with a similar gear 49 on the shaft 29. At the upper end of the shaft 47 is a beveled gear 50 meshing with a similar gear 51 on the rear end of one of the husking rollers, the motion of said roller being transmitted to all the rollers through intermeshing spur gears 52 on the rear ends of the rollers. A sprocket pinion 53 is also secured on the shaft 29 and a chain 54 is trained around said pinion and a sprocket 55 at the front end of the machine. The sprocket 55 is secured on a shaft 56 which carries the lower rear roller of the elevator 15 and may be connected by sprocket gearing, indicated at 56', with the drum or roller carrying the upper front end of the said elevator.

A countershaft 57 is mounted on the frame above the main shaft 29 and is driven thereby through spur gears 58 and 59. A sprocket 60 on the countershaft transmits motion through a chain 61 to a sprocket 62 on the roller or drum 63 supporting the rear bight of the apron or conveyer 13, a deflecting shield 64 being arranged adjacent the said conveyer to carry the husks over and beyond the driving gearing and prevent clogging thereof. The countershaft is also equipped with a sprocket 65 transmitting motion through a chain 66 to a sprocket 67 on the rear upper drum or roller of the elevator 9. It will thus be seen that I have arranged all the operating gearing at the rear end of the machine in compact form so that it is easy of access for lubrication, adjustment, or repairs and all the working parts will be driven in the proper direction.

The tongue 3 is preferably telescopic in construction so that it may be elongated or shortened as circumstances may require. To connect the tongue with the wagon a coupling frame 70 is secured rigidly and projects rearwardly from the rear axle of the wagon and the rear cross bar of this frame is provided with a series of openings 71 in any one of which the coupling pin 72 may be engaged to attach the tongue 3 thereto. The husking machine may thus be adjusted transversely relative to the wagon as may be necessary to conform to the distance between rows in different fields.

From the foregoing description, taken in connection with the accompanying drawings, it will be seen that I have provided a simple machine which will automatically strip ears of corn from the standing stalks, remove the husks and deliver the cobs with the kernels into a wagon which may be drawn at once to the barn or warehouse.

Having thus described the invention, what is claimed as new is:

1. In a husking machine the combination of a frame, snapping rollers mounted thereon, a belt conveyer parallel with the said snapping rollers, the husking rollers inclining in a vertical plane parallel with said snapping rollers, a shelf inclining in the same direction and towards the upper ends of said husking rollers and adapted to receive the unhusked ears from said snapping rollers through the intermediary of said belt, said shelf freely discharging the ears on the husking rollers.

2. In a husking machine the combination of a frame, snapping rollers mounted thereon, a belt conveyer parallel with said snapping rollers, a plurality of pairs of husking rollers inclined in vertical planes parallely with said snapping rollers, a shelf inclined in the same direction as and towards the upper ends of said husking rollers and adapted to receive the unhusked ears from said snapping rollers through the intermediary of said belt, said shelf adapted to freely discharge the ears on each pair of husking rollers respectively.

In testimony whereof I affix my signature.

EDWARD C. SCHROEDER. [L. S.]